United States Patent [19]

Blumrich et al.

[11] Patent Number: 5,120,695

[45] Date of Patent: Jun. 9, 1992

[54] CATALYST FOR PURIFYING EXHAUST GASES FROM INTERNAL COMBUSTION ENGINES AND GAS TURBINES OPERATED AT ABOVE THE STOICHIOMETRIC RATIO

[75] Inventors: Stephan Blumrich, Muehlheim; Reinhold Brand; Bernd Engler, both of Hanau; Wolfgang Honnen, Bruchkoebel; Edgar Koberstein, Alzenau, all of Fed. Rep. of Germany

[73] Assignee: Degusaa Aktiengesellschaft (Degussa AG), Frankfurt am Main, Fed. Rep. of Germany

[21] Appl. No.: 556,097

[22] Filed: Jul. 23, 1990

[30] Foreign Application Priority Data

Jul. 28, 1989 [DE] Fed. Rep. of Germany ....... 3924983
Sep. 4, 1989 [DE] Fed. Rep. of Germany ....... 3929297

[51] Int. Cl.$^5$ .................. B01J 21/06; B01J 23/42; B01J 23/44; B01J 23/46; B01J 35/04
[52] U.S. Cl. ..................... 502/78; 502/204; 502/206; 502/207; 502/217; 502/242; 502/304; 423/213.2; 423/213.5
[58] Field of Search .................. 502/304, 78, 204, 206, 502/207, 217, 242; 423/213.2, 213.5

[56] References Cited

U.S. PATENT DOCUMENTS

| | | | |
|---|---|---|---|
| 3,741,725 | 6/1973 | Graham | 423/213.5 |
| 4,085,193 | 4/1978 | Nakajima et al. | 502/309 X |
| 4,389,382 | 6/1983 | Gandhi et al. | 502/302 X |
| 4,916,107 | 4/1990 | Brand et al. | 502/309 |
| 4,931,419 | 6/1990 | Blanchard et al. | 502/304 |

FOREIGN PATENT DOCUMENTS

| | | |
|---|---|---|
| 2005412 | 6/1990 | Canada . |
| 2010970 | 8/1990 | Canada . |
| 2458888 | 3/1985 | Fed. Rep. of Germany . |
| 3601378 | 3/1988 | Fed. Rep. of Germany . |
| 3841990 | 6/1990 | Fed. Rep. of Germany . |
| 3740289 | 8/1990 | Fed. Rep. of Germany . |
| 63-119850 | 5/1988 | Japan .............. 423/213.2 |

Primary Examiner—W. J. Shine
Attorney, Agent, or Firm—Beveridge, DeGrandi & Weilacher

[57] ABSTRACT

A one-piece catalyst for purifying exhaust gases, particularly from internal combustion engines and gas turbines operated above the stoichiometric ratio. The one-piece honeycomb ceramic or metal carrier has a reduction catalyst on its leading-edge portion and an oxidation catalyst on its trailing-edge portion.

12 Claims, 1 Drawing Sheet

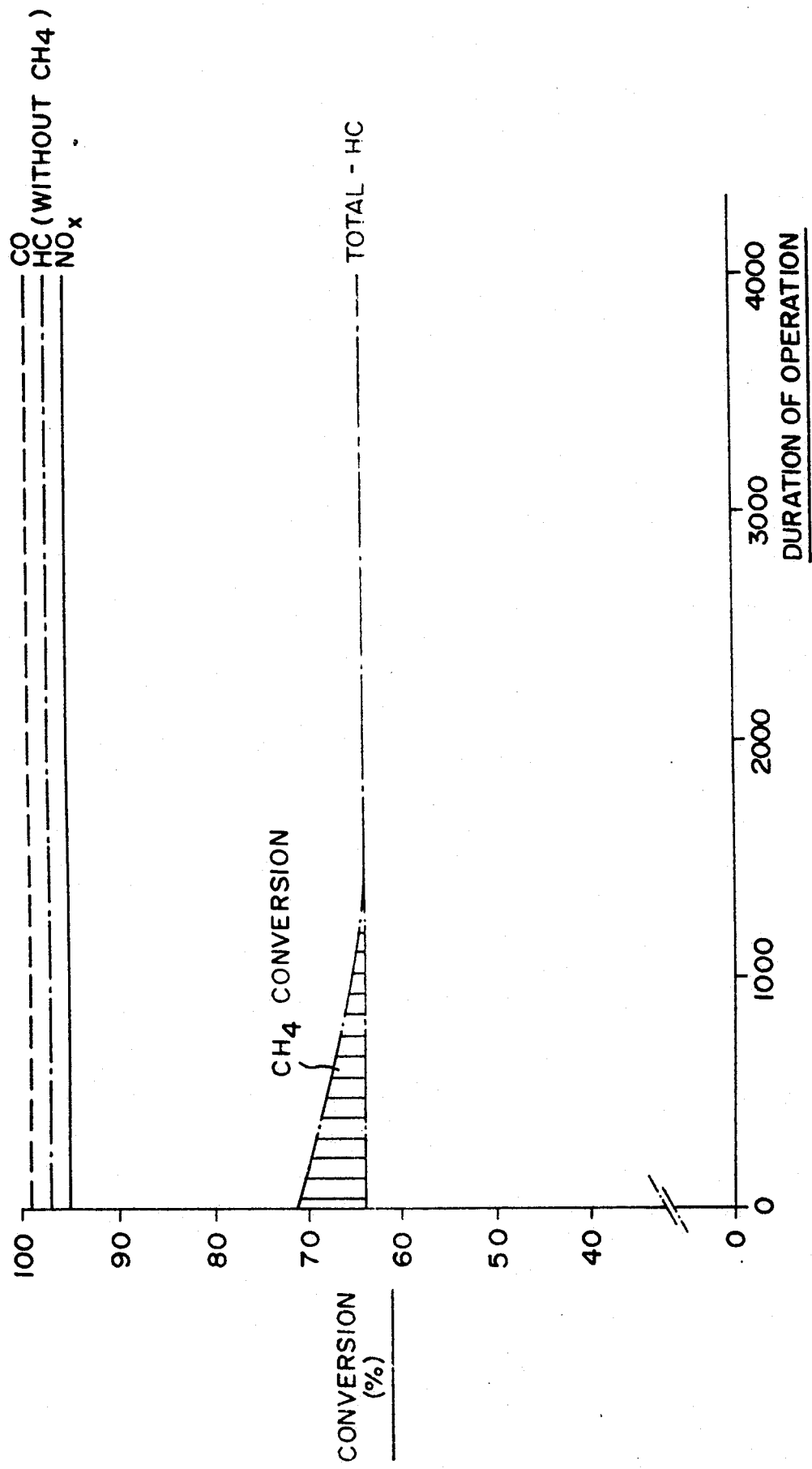

CATALYST FOR PURIFYING EXHAUST GASES FROM INTERNAL COMBUSTION ENGINES AND GAS TURBINES OPERATED AT ABOVE THE STOICHIOMETRIC RATIO

BACKGROUND

The present invention relates to a catalyst for removing pollutants from exhaust gases, and more particularly to a catalyst to be used with internal combustion engines and gas turbines operated at above the stoichiometric ratio.

Exhaust gases from combustion processes in engines and gas turbines are one source of present day pollution of the environment. The air pollutants contained in exhaust gases, i.e. nitrogen oxides, carbon monoxide and a wide variety of unburnt hydrocarbons, are sufficiently known with regard to their effect in polluting the environment.

Primary methods of reducing emission of pollutants, e.g. recycling of exhaust gases or modification of combustion chambers, have not hitherto reduced the omission of pollutants to the required extent or have unacceptably reduced the efficiency of installations. Consequently secondary methods such as catalytic exhaust gas purification are also needed for internal combustion engines and gas turbines.

The exhaust gases produced by burning liquid or gaseous fuel in internal combustion engines and gas turbines, if operating above the stoichiometric ratio, cannot be purified by the three-way catalyst principle. Unburnt hydrocarbons and carbon monoxide in exhaust gas can be removed by catalytic oxidation over an oxidation catalyst, using the oxygen in the exhaust gas, to form carbon dioxide and water, which are compounds compatible with the environment. Nitrogen oxides, owing to the oxygen which they contain, can be removed only by methods of selective catalytic reduction. One well-tried reducing agent is ammonia, obtained if required from an ammonia-producing chemical such as urea, which readily reacts with nitrogen oxides on a suitable catalyst but only reacts to a slight extent with oxygen.

In prior art systems comprising internal combustion engines, the aforementioned exhaust gases are purified by the following process: In one conventional process, the exhaust gases, heated to between 400° and 600° C., flow directly from the engine to an oxidation catalyst, where carbon monoxide and hydrocarbons are oxidized to carbon monoxide and water by the oxygen in the exhaust gas. The exhaust gases are then conveyed over a heat exchanger and cooled to the temperature (350° to 400° C.) required for selected catalytic reduction.

After ammonia has been sprayed in and mixed with the exhaust gas, the nitrogen oxides react with the ammonia over a reduction catalyst in a downstream reactor, forming nitrogen and water. The amount of added ammonia depends on the desired conversion rate and the burden of nitrogen oxides in the exhaust gas. In practice, as a result of bunching, local excesses of ammonia continuously occur. This results in "ammonia drift", i.e. unreacted ammonia enters the stream of exhaust gas behind the reduction catalyst and can thus escape through the chimney into the atmosphere, constituting an undesirable secondary emission When sulfur-containing fuels (e.g. diesel fuel, heavy heating oil or biogases) are used, the ammonia drift is accompanied by reactions between ammonia and the sulfur dioxides in the exhaust gas, resulting in corrosive, sticky, efficiency-reducing deposits of ammonium hydrogen sulfate and/or ammonium sulfate in the heat-exchangers or other downstream parts of the plant. The downstream parts therefore have to be periodically washed, resulting in an additional waste-water problem.

The system has other disadvantages, i.e. the additional pressure loss resulting from the frequent widening and narrowing of the flow cross-section, and the additional high cost of the separate reactors.

German patent specification DE-PS 36 01 378 describes a "Method of purifying exhaust gas from combustion systems containing oxides of nitrogen and sulfur" but this cannot be directly applied to internal combustion engines. Production of sulfuric acid is uneconomic, since the sulfur dioxide concentration in the exhaust gases from internal combustion engines and gas turbines is too low. After being charged with the required amount of ammonia the exhaust gas heated to 250° to 550° C. is conveyed over two different kinds of catalyst disposed one behind the other in a reactor. In the first catalyst step, selective catalytic reduction of nitrogen oxides to nitrogen and water takes place. In the aforementioned method the downstream oxidation catalyst is designed for optimum sulfur trioxide production and resistance to acid and resistance to sulfur trioxide. In the case therefore of exhaust gases from internal combustion engines and gas turbines, which contain little sulfur dioxide, it is necessary to use a catalyst specially designed for catalytic oxidation of hydrocarbons and carbon monoxide.

SUMMARY OF THE INVENTION

An object of the invention is to develop a catalyst for obviating the disadvantages of conventional methods of purifying exhaust gases from internal combustion engines and gas turbines, more particularly when operated above the stoichiometric ratio.

The catalyst on which the invention is based is characterized in that it comprises a one-piece exhaust-gas purifying catalyst in honeycomb form having a leading-edge portion containing a catalyst for selective reduction of nitrogen oxides by ammonia gas, from an ammonia-producing compound if required, and a trailing-edge portion containing an oxidation catalyst In principle, therefore, the exhaust gases are brought into contact in immediate succession, in a single honeycomb-form catalyst component, with two different catalyst formulations, each catalyst possibly known per se and each optimized for the specific reaction involved with the particular waste gas. The various catalyst zones (or reaction zones) for selective reduction of nitrogen oxides and subsequent oxidation will hereinafter be called zone 1 for the reduction part and zone 2 for the oxidation part.

The catalyst according to the invention can be completely in the form of a carrier catalyst or alternatively can be a solid catalyst coated with an oxidation catalyst in zone 2.

In the first-mentioned application, zones 1 and 2 are coatings of two catalyst formulations applied to a substantially inert, structure-reinforcing carrier or metal. The following carrier materials are suitable: ceramic honeycomb members made e.g. of γ-aluminum oxide, mullite, cordierite, zirconium mullite, barium titanite, porcelain, thorium oxide, steatite, boron carbide, silicon carbide, silicon nitride or metal members made of highgrade steel or "heat-conducting" alloys (Cr/Fe/Al alloys). Such inert ceramic or metal carriers are well known in the art.

In the second aforementioned advantageous application, an oxidation catalyst in the form of a coating is applied to the trailing-edge portion (zone 2) of a solid catalyst in honeycomb form consisting of a metal oxide mixture or a metal-containing zeolite.

The exhaust gas containing pollutants is supplied at a temperature range between 250° and 550° C. to the exhaust-gas purification plant containing the catalyst. The temperature level chosen for a particular plant depends on technical or economic criteria such as the temperature of the engine exhaust gas, oxidation of ammonia, concentration of heat, production costs, or the required rates of reduction of pollutants.

After entering a mixer disposed upstream of the catalyst system, the exhaust gas is mixed with the reducing agent (ammonia, if required from an ammonia-dispensing chemical). Any suitable mixer can be used for this purpose as will be apparent to those skilled in the art.

Next, the gas is conveyed over the catalyst zone 1, where selected catalytic reduction of nitrogen oxides to nitrogen and water occurs. The reduction catalyst especially suitable for the invention is a solid catalyst comprising an intimate mixture of the following components:

(A) titanium in the form of oxides,
(B) at least one metal from the following group;
B.1 iron and vanadium in the form of oxides and/or sulfates and or the group
B.2 molybdenum, tungsten, niobium, copper or chromium in the form of oxides, and/or
(C) tin in the form of oxides, and/or
(D) metals from the group beryllium, magnesium, zinc, boron, aluminum, yttrium, rare earth elements, silicon, antimony, bismuth and manganese in the form of oxides,
the components being present in the atomic ratios;

$$A : B : C : D = 1 : 0.01 \text{ to } 10 : 0 \text{ to } 0.2 : 0 \text{ to } 0.15.$$

In a more detailed aspect the reduction catalyst is the form of a solid catalyst comprising an intimate mixture of titanium dioxide as a component A), tungsten oxide as a component $B_1$ and vanadium, iron, niobium, copper, chromium and/or molybdenum oxide as a component $B_2$, the atomic ratio of the metals in components A) and B) being from 1 : 001 to 1, the component A) being a finely divided oxide obtainable by flame hydrolysis of $TiCl_4$ and having a mainly anatase X-ray structure, a BET surface area of $50\pm15$ m$^2$/g, a density of 3.8 g/cm$^3$, an average primary particle size of 30 nm, a pH of 3–4 measured in 4% aqueous dispersion and an isoelectric point at pH 6.6, the substance having a $TiO_2$ content of 99.5 wt.%, an $Al_2O_3$ of 0.3 wt %, an $SiO_2$ content of 0.2 wt.%, an $Fe_2O_3$ content of 0.01 wt.% and an HCl content 0.3 wt.% after calcining at 1000° C. for 2 hours, and having a weight loss of 1.5 wt.% after drying at 105° C. for 2 hours and of 2 wt.% after calcining at 1000° C. for 2 hours.

According to an alternate form of the invention, the reduction catalyst contains the following components;
A) titanium oxide $B_1$) at least one oxide of tungsten, silicon, boron, aluminum, phosphorus, zirconium, barium, yttrium, lanthanum or cerium and
$B_2$) at least one oxide of vanadium, niobium, molybdenum, iron, copper or chromium, the atomic ratio of the elements in components A) and B) being from 1 : 0.001 to 1, preferably 1 : 0.002 to 0.4, and the component A) being present in the form of a reactive high surface-area titanium oxide having a BET surface area of 40–500, preferably 50–300, more particularly 60–150 m$^2$/g and completely or mainly in the anatase modification.

Still further the reduction catalyst used in the invention can be an acid-resistant zeolite full type catalyst, optionally of mordenite type, containing copper and/or iron and, optionally, cerium or molybdenum.

In zone 2, which directly follows on the same catalyst component, carbon monoxide and hydrocarbons are oxidized, and also the ammonia flowing through zone 1 is removed. Special known formulations of oxidation catalysts are also suitable for converting sulfur dioxide to sulfur trioxide. The end products of the catalytic reduction and oxidation processes are carbon dioxide water, nitrogen and sulfur trioxide. Oxidation catalyst suitable for present purposes are well known in the art.

The exhaust gas coming from the reactor after leaving the oxidation zone does not contain any ammonia, since the ammonia has been oxidized to nitrogen and nitrogen oxides. Consequently the plant cannot become clogged or encrusted or corroded by ammonium salts. The slight increase in emission of nitrogen oxides resulting from ammonia oxidized to nitrogen oxides can be reduced to a minimum by simple control measures Use of the catalysts according to the invention, which are in one piece but have two zones, has the aforementioned practical advantages and also has the advantage of considerably reducing the pressure loss, owing to the absence of multiple widening and constriction of the flow cross-section which occur in conventional catalyst systems involving separate carriers located in a series circuit The present invention also avoids undesirable turbulence zones which can occur between a number of separated catalyst components.

Another appreciable advantage is the reduction in cost as compared with the prior art, resulting from the reduction in the number of reactors. The cost of packing and storing the catalyst components in the reactor can also be reduced in an arrangement according to the invention.

Solid extrudates in honeycomb form are advantageously used for reduction and also as carriers for the oxidation area (zone 2). These extrudates are solid catalysts comprising titanium dioxide and also containing e.g. tungsten or vanadium oxide, e.g. as per German patent DE-PS 24 58 888, German patent application P 37 40 289.7-41 corresponds to U.S. Pat. No. 4,916,107, German patent application P 39 06 136.1 corresponding to U.S. patent application Ser. No. 07/484,405 or comprising zeolite, e.g. as per German patent application P 38 41 990.4-43 corresponding to U.S. patent application Ser. No. 07/448,198. These disclosures are incorporated herein by reference.

These extrudates have the composition of an intimate mixture of the following components:
(A) titanium in the form of oxides,
(B) at least one metal from the following group;
B.1 iron and vanadium in the form of oxides and/or sulfates and/or the group B.2 molybdenum, tungsten, niobium, copper or chromium in the form of oxides, and/or (C) tin in the form of oxides, and/or (D) metals from the group beryllium, magnesium, zinc, boron, aluminum, yttrium, rare earth elements, silicon, antimony, bismuth and manganese in the form of oxides, the components being present in the atomic ratios;

A : B : C : D = 1 : 0.01 to 10 : 0 to 0.2 : 0 to 0.15.

The oxidation zone 2 can be prepared by applying a suitable catalyst coating to a rear portion of the reduction catalyst. Depending on the design, the region coated with the oxidizing formulation occupies 20 to 50% of the volume of catalyst. It is usually sufficient to coat 25 to 35% of each catalyst component with the oxidation catalyst The oxidation catalyst can be formulated in accordance with DE-PS 29 07 106 or can comprise γ-aluminum oxide with 3 to 35 wt.% cerium oxide and 1 to 5 wt.% zirconium oxide and platinum, platinum/palladium, platinum/rhodium or palladium, the noble metal being in reduced and highly-dispersed form on the catalyst. Such noble metal oxidation catalysts are well known in this technology. The oxidation catalyst can comprise 2 to 70 wt.% $CeO_2$ and 0 to 20 wt.% $ZrO_2$ and, optionally, iron oxide, alkaline earth metal oxides and/or aluminum oxide of the transition series containing rare earth-metal oxides as the carrier and an active phase applied to the carrier and comprising 0.01 to 3 wt.% of platinum, palladium and/or palladium to rhodium, if present, being from 2 : 1 to 30 : 1.

Advantageously the proportion of noble metal in the catalytic coating of zone 2 is from 0.25 to 2.8 wt.%.

BRIEF DESCRIPTION OF DRAWING

The present invention will be further understood with reference to the drawing which shows a plot of conversion rate with time.

DETAILED EMBODIMENT OF THE INVENTION

EXAMPLES 1-4

In accordance with German patent application P 37 40 289.7-41, Example 17, a catalyst in honeycomb form (dimensions: 150 mm × 150 mm × 440 mm, cell spacing: 3.6 mm) was manufactured with a $TiO_2/WO_3$ weight ratio of 9 : 1 and a $V_2O_5$ content of 0.45 wt.%. $TiO_2$ manufactured by flame hydrolysis was used as the titanium dioxide component.

In order to apply the oxidation coating to 30% of the total length, in a first working step an oxide mixture of γ-$Al_2O_3$, $CeO_2$ and $ZrO_2$ was applied as follows:

60 g $CeO_2$ and 3 g $ZrO_2$ in acetate form were added per 100 g γ-$Al_2O_3$ to a 25 wt.% aqueous suspension of γ-aluminum oxide The trailing-edge of the aforementioned honeycomb member was coated by immersing 30% of the total length in the suspension. After the immersion step, the channels in the monolith were blown open with compressed air and dried in an airstream at 150° C., followed by heat-treatment at 550° C. for 2 hours 80-90 g of mixed oxide coating remained per liter volume of catalyst.

The noble metal was obtained by impregnation with an aqueous solution of hexachloroplatinic acid or palladium chloride or rhodium chloride. After drying at 150° C., the noble metals were reduced in a hydrogen atmosphere at 550° C. The amounts of noble metal are shown in Table 2.

TABLE 2

Amounts of noble metals in the oxide catalyst coating

| Example | Noble metal | Content of noble metal relative to oxidation coating, wt. % |
|---|---|---|
| 1 | Pt | 1.5 |
| 2 | Pt/Pd (2:1) | 1.5 |
| 3 | Pt/Rh (10:1) | 1.5 |
| 4 | Pd | 1.5 |

EXAMPLE 5

In accordance with German patent specification 24 58 888, Example X-1, a honeycomb member was made with the same geometrical dimensions as described in Example 1. The ratio by weight of $TiO_2$ to $WO_3$ was 9 : 1, and the $V_2O_5$ content was 0.45 wt %. Precipitated anatase-type $TiO_2$ having a specific surface area of 70 $m^2$ was used as the $TiO_2$ component. The oxidation catalyst coating was applied as described in Examples 1-4 herein, along 20% of the total length starting from the trailing-edge. The noble metal was 2.5 wt.% of platinum, relative to the coating.

EXAMPLE 6

In accordance with German patent application P 38 41 990, Example 32, a zeolite honeycomb member was manufactured with the same geometrical dimensions as described in Example 1 above.

Mordenite with modulus 19 ($SiO_2/Al_2O_3$ molar ratio) was used as the zeolite. The active components inserted by ion exchange were 1.0 wt.% copper, 0.58 wt.% iron and 0.1 wt.% cerium.

The oxidation catalyst coating was applied as described in Examples 1-4 herein, along 50% of the total length. 1.0 wt.% platinum was used as the noble metal

EXAMPLE OF APPLICATION

A pilot plant supplied with exhaust gases from an internal combustion engine operating on a lean mixture, was used for testing the catalysts according to the invention. The catalysts according to the invention were solid extrudates consisting of honeycomb members 440 mm long and having an edge length of 150 mm × 150 mm. The cell spacing (one web + one cell opening) was 3.6 mm.

The technical data of the pilot plant can be summarized as follows:

| Flue gas throughput: | 105 $m^3$/h i.N. |
|---|---|
| Space velocity | |
| —$NO_x$ reduction | 15,000 $h^{-1}$ |
| —CO/HC oxidation | 36,000 $h^{-1}$ |
| Exhaust gas speed in reactor (speed in empty tube) | 1.2 m/s |
| Flue gas temperature | 400-520° C. |
| $NH_3/NO_x$ molar ratio | 0.8-1.2. |

After 4000 hours of operation, the measured conversion rate of nitrogen oxides was 95%, using a catalyst as in Example 1 herein and a molar ratio of ammonium to nitrogen oxides of 0.95. The conversion rates for carbon monoxide and hydrocarbons are shown in Table 1 and in the graph in FIG. 1.

TABLE 1

Conversion rates of pollutants ($NO_x$, CO and HC) after 4000 hours of operation

| Pollutant | Concentration Before combined catalyst | Concentration After combined catalyst | Degree of conversion, % | Method of measurement |
|---|---|---|---|---|
| $NO_x$ | 3000 ppm | 160 ppm | 95* | Chemiluminescence method |
| CO | 2300 ppm | 15 ppm | 99 | NDIR |
| Total HC | 3600 ppm | 1300 ppm | 64 | FID |
| HC without $CH_4$ | 2300 ppm | 80 ppm | 97 | FID |
| $O_2$ | 7 vol. % | 6.5 vol. % | — | Paramagnetism |
| $NH_3$ | 2790 ppm | Not detectable | | wet chemical absorption and analysis |

*Molar ratio 0.95, operating temperature 480° C.

In no case, under the operating conditions, was ammonia detectable in the exhaust gas behind the catalytic converter. The installation was free from ammonia drift over a wide range of operation.

FIG. 1 is a graph of the conversion of pollutants in dependence on time of operation. The conversion curve for hydrocarbons including methane (total HC) shows that the catalyst when fresh also oxidizes methane. The conversion of methane, however, decreases after about 1000 hours of operation Further variations and modifications of the foregoing will be apparent to those skilled in the art and are intended to be encompassed by the claims appended hereto.

German priority application P 39 24 983.2 and German priority application P 39 29 297.5 as well as all other patent documents identified herein are relied on and incorporated by references.

We claim:

1. A catalyst for purifying exhaust gases comprising a full solid, one-piece exhaust-gas purifying reduction catalyst in honeycomb form for selective reduction of nitrogen oxides contained in said exhaust gases by ammonia gas or by an ammonia producing compound said honeycomb having a trailing-edge portion which is coated with an oxidation catalyst capable of oxidizing components in said exhaust gases, and said coated portion amounts to 20-50% of the total volume of said catalyst.

2. The catalyst according to claim 1, wherein the full solid reduction catalyst comprises an intimate mixture of the following components:
   (A) titanium in the form of oxides,
   (B) at least one metal from the following group;
      B.1 iron and vanadium in the form of oxides and/or sulfates and/or the group
      B.2 molybdenum, tungsten, niobium, copper or chromium in the form of oxides, and/or
   (C) tin in the form of oxides, and/or
   (D) metals from the group beryllium, magnesium, zinc, boron, aluminum, yttrium, rare earth elements, silicon, antimony, bismuth and manganese in the form of oxides,
the components being present in the atomic ratios;

A : B : C : D = 1 : 0.01 to 10 : 0 to 0.2 : 0 to 0.15.

3. The catalyst according to claim 1 wherein the full solid reduction catalyst comprises an intimate mixture of titanium dioxide as a component A), tungsten oxide as a component $B_1$ and at least one oxide of vanadium, iron, niobium, copper, chromium or molybdenum as a component $B_2$,
   the atomic ratio of the metals in components A) and B) being from 1 : 001 to 1,
   the component A) being a finely divided oxide obtainable by flame hydrolysis of $TiCl_4$ and having a mainly anatase X-ray structure, a BET surface area of $50 \pm 15$ m$^2$/g, a density of 3.8 g/cm$^3$, an average primary particle size of 30 nm, a pH of 3-4 measured in 4% aqueous dispersion and an isoelectric point at pH 6.6, the substance having a $TiO_2$ content of 99.5 wt.%, an $Al_2O_3$ content of 0.3 wt.%, an $SiO_2$ content of 0.2 wt.%, an $Fe_2O_3$ content of 0.01 wt.% and an HCl content of 0.3 wt.% after calcining at 1000° C. for 2 hours, and having a weight loss of 1.5 wt.% after drying at 105° C. for 2 hours and of 2 wt.% after calcining at 1000° C. for 2 hours.

4. The catalyst according to claim 1, characterized in that the reduction catalyst contains the following components;
   A) titanium oxide
   $B_1$) at least one oxide of tungsten, silicon, boron, aluminum, phosphorus, zirconium, barium, yttrium, lanthanum or cerium and
   $B_2$) at least one oxide of vanadium, niobium, molybdenum, iron, copper or chromium,
the atomic ratio of the elements in components A) and B) being from 1 : 0.001 to 1, and the component A) being present in the form of a reactive high surface-area titanium oxide having a BET surface area of 40-500 m$^2$/g and completely or mainly in the anatase modification.

5. The catalyst according to claim 4, wherein the atomic ratio of the elements in components A) and B) are 1 : 0.002 to 0.4.

6. The catalyst according to claim 4, wherein the BET surface area is 50-300 m$^2$/g.

7. The catalyst according to claim 4, wherein the BET surface area is 60-150 m$^2$/g.

8. The catalyst according to claim 1, wherein the full solid reduction catalyst is an acid-resistant mordenite catalyst, containing copper and/or iron and, optionally, cerium or molybdenum.

9. The catalyst according to claim 1, wherein said coated portion amounts to 25 to 35% of the total volume of the catalyst.

10. The catalyst according to claim 9, wherein the extrudate has the composition of an intimate mixture of the following components:
   (A) titanium in the form of oxides,
   (B) at least one metal from the following group;
      B.1 iron and vanadium in the form of oxides and/or sulfates and/or the group
      B.2 molybdenum, tungsten, niobium, copper or chromium in the form of oxides, and/or
   (C) tin in the form of oxides, and/or
   (D) metals from the group beryllium, magnesium, zinc, boron, aluminum, yttrium, rare earth elements, silicon, antimony, bismuth and manganese in the form of oxides,
the components being present in the atomic ratios;

A : B : C : D = 1 : 0.01 to 10 : 0 to 0.2 : 0 to 0.15.

11. The catalyst according to claim 1, wherein said oxidation catalyst comprises 2 to 70 wt.% $CeO_2$ and 0 to 20 wt % $ZrO_2$ and, optionally, iron oxide, alkaline earth metal oxides and/or aluminum oxide of the transition series containing rare earth-metal oxides as the carrier and an active phase applied to the carrier and comprising 0.01 to 3 wt.% of platinum, palladium and/or rhodium, the ratio by weight of platinum, palladium and/or palladium to rhodium, if present, being from 2 : 1 to 30 : 1.

12. The catalyst according to claim 1, wherein the honeycomb carrier is coated in the amount of 20 to 50% of its volume with oxidation catalyst.